(12) United States Patent
Kröling (10) Patent No.: US 11,181,652 B2
(45) Date of Patent: Nov. 23, 2021

(54) COMPLIANCE CHAMBERS FOR MARINE VIBRATORS

(71) Applicant: PGS Geophysical AS, Oslo (NO)

(72) Inventor: Nils Gunnar Olof Kröling, Bjarred (SE)

(73) Assignee: PGS Geophysical AS, Oslo (NO)

( * ) Notice: Subject to any disclaimer, the term of this patent is extended or adjusted under 35 U.S.C. 154(b) by 391 days.

(21) Appl. No.: 16/406,967

(22) Filed: May 8, 2019

(65) Prior Publication Data

US 2019/0265371 A1    Aug. 29, 2019

Related U.S. Application Data

(63) Continuation of application No. 15/433,922, filed on Feb. 15, 2017, now Pat. No. 10,302,783, which is a
(Continued)

(51) Int. Cl.
*G01V 1/137*    (2006.01)
*G01V 1/135*    (2006.01)
(Continued)

(52) U.S. Cl.
CPC .............. *G01V 1/137* (2013.01); *F15B 15/06* (2013.01); *G01V 1/135* (2013.01); *G01V 1/3808* (2013.01); *G01V 1/38* (2013.01)

(58) Field of Classification Search
CPC .......... G01V 1/135; G01V 1/137; G01V 1/38; G01V 1/3808; G01V 1/001; G01V 1/003;
(Continued)

(56) References Cited

U.S. PATENT DOCUMENTS 3,384,868 A    5/1968  Brown
3,412,704 A *  11/1968  Paull .................... G01V 1/3826
                                          114/245
(Continued)

FOREIGN PATENT DOCUMENTS

EP    0835462 B1    1/2003
EP    3009863 A2    4/2016
(Continued)

OTHER PUBLICATIONS

Rune Tenghamn, "PGS Electrical Marine Vibrator," Tech Link, Nov. 2005, pp. 1-3, vol. 5, No. 11, Publication of PGS Geophysical.
(Continued)

*Primary Examiner* — Isam A Alsomiri
*Assistant Examiner* — Amie M Ndure (57) ABSTRACT

A marine vibrator may include a containment housing, a sound radiating surface, and a compliance chamber. The compliance chamber may include a compliance chamber housing, a non-linear linkage assembly, and a low pressure chamber. The compliance chamber housing may define at least a portion of a compliance chamber internal volume having a compliance chamber internal gas pressure. The low pressure chamber may comprise a low pressure piston and a low pressure chamber housing. The low pressure chamber housing may define at least a portion of a low pressure chamber internal volume having a low pressure chamber internal gas pressure. The low pressure piston may be configured to move in response to a pressure differential across the low pressure piston such that a resonance frequency of the marine vibrator may be changed.

20 Claims, 6 Drawing Sheets

Related U.S. Application Data continuation of application No. 15/191,077, filed on Jun. 23, 2016, now Pat. No. 9,588,242, which is a continuation of application No. 14/723,241, filed on May 27, 2015, now Pat. No. 9,389,327.

(60) Provisional application No. 62/064,104, filed on Oct. 15, 2014.

(51) Int. Cl.
   *F15B 15/06* (2006.01)
   *G01V 1/38* (2006.01)

(58) Field of Classification Search
   CPC ........ G01V 1/005; G01V 1/006; G01V 1/133; G01V 1/143; G01V 1/18; G01V 1/181; G01V 1/186; G01V 1/189; G01V 1/22; G01V 1/387; G01V 1/3861; G01V 1/3843; G01V 1/3852; G01V 13/00; Y02E 30/30; F15B 15/06; F15B 15/063
   See application file for complete search history.

(56) References Cited

U.S. PATENT DOCUMENTS

| | | |
|---|---|---|
| 3,434,446 A * | 3/1969 | Cole .................. G01V 1/3826 114/245 |
| 3,978,940 A | 9/1976 | Bouyoucos |
| 4,175,311 A | 11/1979 | Bunyan |
| 4,185,714 A * | 1/1980 | Pascouet .................. F15C 1/22 181/115 |
| 4,211,301 A | 7/1980 | Mifsud |
| 4,231,112 A | 10/1980 | Massa |
| 4,483,411 A | 11/1984 | Mifsud |
| 4,556,963 A | 12/1985 | Hugus et al. |
| 4,557,348 A | 12/1985 | Mifsud |
| 4,578,784 A | 3/1986 | Mifsud |
| 4,603,409 A * | 7/1986 | Jaworski ................ G01V 1/133 181/120 |
| 4,739,859 A | 4/1988 | Delano |
| 4,785,430 A | 11/1988 | Cole |
| 4,853,905 A | 8/1989 | Myers |
| 5,016,228 A | 5/1991 | Arnold et al. |
| 5,050,129 A | 9/1991 | Schultz |
| 5,062,089 A * | 10/1991 | Willard .................. G01V 1/135 367/172 |
| 5,126,979 A | 6/1992 | Rowe, Jr. et al. |
| 5,163,028 A * | 11/1992 | Barr ........................ G01V 1/16 367/13 |
| 5,199,005 A | 3/1993 | Forsberg |
| 5,206,839 A | 4/1993 | Murray |
| 5,225,731 A | 7/1993 | Owen |
| 5,233,570 A | 8/1993 | Donskoy |
| 5,646,380 A | 7/1997 | Vaage |
| 5,757,726 A | 5/1998 | Tenghamn et al. |
| 5,757,728 A | 5/1998 | Tenghamn et al. |
| 5,959,939 A | 9/1999 | Tenghamn et al. |
| 5,978,316 A | 11/1999 | Ambs |
| 6,009,047 A | 12/1999 | Barger |
| 6,041,888 A | 3/2000 | Tenghamn |
| 6,076,629 A | 6/2000 | Tengham |
| 6,076,630 A | 6/2000 | Ambs |
| 6,085,862 A | 7/2000 | Tenghamn |
| 6,230,840 B1 | 5/2001 | Ambs |
| 6,173,803 B1 | 11/2001 | Barger |
| 6,556,510 B2 | 4/2003 | Ambs |
| 6,606,958 B1 | 8/2003 | Bouyoucos |
| 6,624,539 B1 | 9/2003 | Hansen et al. |
| 6,711,097 B1 | 3/2004 | Engdahl |
| 6,851,511 B2 | 2/2005 | Tenghamn |
| 6,901,028 B2 | 5/2005 | Clayton et al. |
| 7,142,481 B1 | 11/2006 | Metzbower et al. |
| 7,468,932 B2 | 12/2008 | Tenghamn |
| 7,539,079 B2 | 5/2009 | Hoogeveen et al. |
| 7,551,518 B1 | 6/2009 | Tenghamn |
| 7,562,740 B2 * | 7/2009 | Ounadjela .............. G01V 1/143 181/113 |
| 7,881,158 B2 | 2/2011 | Tenghamn |
| 7,926,614 B2 | 4/2011 | Tenghamn et al. |
| 7,929,380 B2 | 4/2011 | Wei et al. |
| 7,957,220 B2 | 6/2011 | Howlid et al. |
| 7,974,152 B2 | 7/2011 | Tenghamn |
| 8,050,139 B2 | 11/2011 | Berstad |
| 8,050,867 B2 | 11/2011 | Johnson et al. |
| 8,061,471 B2 | 11/2011 | Wei |
| 8,079,440 B2 | 12/2011 | Laycock |
| 8,081,540 B2 | 12/2011 | Ross |
| 8,094,514 B2 | 1/2012 | Tenghamn |
| 8,098,542 B2 | 1/2012 | Hillesund et al. |
| 8,102,731 B2 | 1/2012 | Cambois |
| 8,154,176 B2 | 4/2012 | Karakaya et al. |
| 8,167,082 B2 | 5/2012 | Eick et al. |
| 8,174,927 B2 | 5/2012 | Hopperstad et al. |
| 8,189,426 B2 | 5/2012 | West et al. |
| 8,205,711 B2 | 6/2012 | Hopperstad et al. |
| 8,261,875 B2 | 9/2012 | Eick et al. |
| 8,331,198 B2 | 12/2012 | Morozov et al. |
| 8,335,127 B2 | 12/2012 | Tenghamn |
| 8,342,288 B2 | 1/2013 | Eick et al. |
| 8,400,872 B2 | 3/2013 | Gulgne et al. |
| 8,427,901 B2 | 4/2013 | Lunde et al. |
| 8,441,892 B2 | 5/2013 | Morozov et al. |
| 8,446,798 B2 | 5/2013 | Tenghamn |
| 8,582,395 B2 | 11/2013 | Ferber |
| 8,630,149 B2 | 1/2014 | Thompson et al. |
| 8,634,276 B2 | 1/2014 | Morozov et al. |
| 8,662,243 B2 | 3/2014 | Eick et al. |
| 8,670,292 B2 | 3/2014 | Engdahl |
| 8,804,462 B2 | 8/2014 | Barbour et al. |
| 8,971,152 B2 | 3/2015 | Chelminski |
| 9,389,327 B2 * | 7/2016 | Kroling .................. F15B 15/06 |
| 9,588,242 B2 | 3/2017 | Kröling |
| 2002/0118602 A1 * | 8/2002 | Sen ........................ G01V 1/362 367/151 |
| 2006/0193203 A1 | 8/2006 | Tenghamn et al. |
| 2006/0256651 A1 * | 11/2006 | Sanders .................. G01V 1/02 367/15 |
| 2008/0253226 A1 | 10/2008 | Tenghamn et al. |
| 2009/0147626 A1 | 6/2009 | Vahida et al. |
| 2009/0279387 A1 | 11/2009 | Tenghamn et al. |
| 2010/0118647 A1 | 5/2010 | Tenghamn |
| 2010/0302900 A1 | 12/2010 | Tenghamn |
| 2010/0322028 A1 * | 12/2010 | Tenghamn .............. G01V 1/159 367/21 |
| 2011/0038225 A1 | 2/2011 | Tenghamn |
| 2011/0069741 A1 | 3/2011 | Erickson |
| 2011/0075520 A1 | 3/2011 | Gulgne et al. |
| 2011/0085422 A1 | 4/2011 | Thompson et al. |
| 2011/0090759 A1 | 4/2011 | Laycock |
| 2011/0162906 A1 * | 7/2011 | Harper .................. G01V 1/135 181/120 |
| 2011/0297476 A1 | 12/2011 | Harper et al. |
| 2011/0317515 A1 | 12/2011 | Tenghamn |
| 2012/0075955 A1 | 3/2012 | Dean |
| 2012/0081997 A1 | 4/2012 | Babour et al. |
| 2012/0113747 A1 | 5/2012 | Ferber |
| 2012/0147699 A1 | 6/2012 | Dellinger et al. |
| 2012/0147709 A1 | 6/2012 | Zowarka, Jr. et al. |
| 2012/0155217 A1 | 6/2012 | Dellinger et al. |
| 2012/0188845 A1 | 7/2012 | Jeffryes |
| 2012/0232780 A1 | 9/2012 | Delson et al. |
| 2012/0314536 A1 | 12/2012 | Bagaini |
| 2013/0037342 A1 | 2/2013 | Engdahl |
| 2013/0044565 A1 | 2/2013 | Barr et al. |
| 2013/0100777 A1 | 4/2013 | Ruet |
| 2014/0226439 A1 | 8/2014 | Tenghamn |
| 2014/0238773 A1 | 8/2014 | Sallas |
| 2014/0334254 A1 | 11/2014 | Zrostlik et al. |
| 2014/0334259 A1 | 11/2014 | Tenghamn |
| 2014/0340985 A1 | 11/2014 | Tenghamn et al. |
| 2015/0085605 A1 | 3/2015 | Tenghamn |
| 2015/0085606 A1 | 3/2015 | Tenghamn et al. |
| 2015/0085607 A1 | 3/2015 | Tenghamn |

(56) References Cited

U.S. PATENT DOCUMENTS

| | | | |
|---|---|---|---|
| 2015/0085608 A1 | 3/2015 | Tenghamn et al. | |
| 2015/0234072 A1 | 8/2015 | McConnell | |
| 2016/0077227 A1* | 3/2016 | Lockwood | G01V 1/137 367/15 |
| 2016/0363677 A1* | 12/2016 | Andersen | G01V 1/38 |
| 2017/0168175 A1 | 6/2017 | Kröling | |

FOREIGN PATENT DOCUMENTS

| | | |
|---|---|---|
| RU | 93052952 A | 2/1995 |
| RU | 2159945 C1 | 11/1999 |
| WO | 9530912 A1 | 11/1995 |
| WO | 9701770 A1 | 1/1997 |
| WO | 0071266 A1 | 11/2000 |

OTHER PUBLICATIONS

Rune Tenghamn and Andrew Long, PGS shows off electrical marine vibrator to capture 'alternative' seismic source market, First Break, Jan. 2006, pp. 11-14, vol. 24.

Rune Tenghman, "Complementing Seismic Source Technology with Marine Vibrators," Presented at PGS Technology day in Oslo, Norway, Oct. 16, 2012.

Feng et al., "A Class IV Flextensional Device Based on Electrostrictive Poly(vinylidene fluoride-trifluoroethylene Copolymer," Jun. 2003, pp. 1-6.

Ralph S. Woollett, "Underwater Helmholtz-Resonator Transducers: General Design Principles," NUSC Technical Report 5633, Jul. 5, 1977, pp. 1-48.

Rolex Spring Catalog, MW Industries, Inc., 2009.

Fons Ten Kroode et al., "Broadband seismic data—The importance of low frequencies," Geophysics, Mar.-Apr. 2013, pp. WA3-WA14, vol. 78, No. 2.

Ralph S. Woollett, "Current Approaches to the Miniaturization and Pressure Release Problems of VLF Transducers," Naval Underwater Systems Center, Nov. 1973.

Erardo Elizondo, "Production of Optimised Metal Foams for Stirling Engine Regenerators," Mar. 2011.

Notice of Allowance for U.S. Appl. No. 14/723,241 dated Mar. 31, 2016.

European Search Report for Application No. EP15188219 dated Oct. 7, 2016.

Notice of Allowance for U.S. Appl. No. 15/191,077 dated Nov. 23, 2016.

European Communication for Application No. 15188219.8 dated Jun. 20, 2016.

Notice of Allowance for U.S. Appl. No. 15/433,922 dated Jan. 15, 2019.

\* cited by examiner

COMPLIANCE CHAMBERS FOR MARINE VIBRATORS

BACKGROUND

Embodiments relate generally to marine vibrators for marine seismic surveys, and, more particularly, embodiments relate to the use of compliance chambers in marine vibrators to compensate for air-spring effects.

Sound sources are generally devices that generate acoustic energy. One use of sound sources is in marine seismic surveying. Sound sources may be employed to generate acoustic energy that travels downwardly through water and into subsurface rock. After interacting with the subsurface rock, for example, at the boundaries between different subsurface layers, some of the acoustic energy may be reflected back toward the water surface and detected by specialized sensors. The detected energy may be used to infer certain properties of the subsurface rock, such as the structure, mineral composition and fluid content. These inferences may provide information useful in the recovery of hydrocarbons.

Most of the sound sources employed today in marine seismic surveying are of the impulsive type, in which efforts are made to generate as much energy as possible during as short a time span as possible. The most commonly used of these impulsive-type sources are air guns that typically utilize a compressed gas to generate a sound wave. Other examples of impulsive-type sources include explosives and weight-drop impulse sources. Marine vibrators are another type of sound source that can be used in marine seismic surveying. Types of marine vibrators may include hydraulically powered sources, electro-mechanical vibrators, electrical marine vibrators, or sources employing piezoelectric or magnetostrictive material. Marine vibrators typically generate vibrations through a range of frequencies in a pattern known as a "sweep" or "chirp".

A marine vibrator may radiate sound by moving one or more sound radiating surfaces that may be connected to a mechanical actuator. During this motion these surfaces displace a certain volume. This displaced volume may be the same outside and inside the marine vibrator. Inside the marine vibrator this volume displacement may cause a pressure variation that in absolute values increases substantially while the marine vibrator is lowered to increasing depths. As the internal gas (e.g., air) in the marine vibrator increases in pressure, the bulk modulus (or "stiffness") of the internal gas also rises. Increasing the bulk modulus of the internal gas also increases the air-spring effect within the marine vibrator. As used herein, the term "air-spring" is defined as an enclosed volume of gas that may absorb shock or fluctuations of load due to the ability of the enclosed volume of gas to resist compression. Increasing the stiffness of the gas in the enclosed volume increases the air-spring effect and thus the ability of the enclosed volume of gas to resist compression. This increase in the air-spring effect of the internal gas tends to be a function of the operating depth of the source. Further, the stiffness of the acoustic components of the marine vibrator and the internal gas are primary determining factors in the marine vibrator's resonance frequency. Accordingly, the resonance frequency generated by the marine vibrator may undesirably increase when the marine vibrator is disposed (e.g., towed) at depth, especially in marine vibrators where the interior volume of the marine vibrator may be pressure balanced with the external hydrostatic pressure. Hence, in marine seismic survey applications it may be desirable that a resonance frequency can be retained independently of the operation depth and/or that the output resonance frequency can be controlled so as to be below and/or above its nominal resonance frequency.

BRIEF DESCRIPTION OF THE DRAWINGS

These drawings illustrate certain aspects of some of the embodiments of the present invention and should not be used to limit or define the invention.

DETAILED DESCRIPTION

It is to be understood that the present disclosure is not limited to particular devices or methods, which may, of course, vary. It is also to be understood that the terminology used herein is for the purpose of describing particular embodiments only, and is not intended to be limiting. All numbers and ranges disclosed herein may vary by some amount. Whenever a numerical range with a lower limit and an upper limit is disclosed, any number and any included range falling within the range are specifically disclosed. Although individual embodiments are discussed, the invention covers all combinations of all those embodiments. As used herein, the singular forms "a", "an", and "the" include singular and plural referents unless the content clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." The term "coupled" means directly or indirectly connected. If there is any conflict in the usages of a word or term in this specification and one or more patent or other documents that may be incorporated herein by reference, the definitions that are consistent with this specification should be adopted for the purposes of understanding the invention.

Embodiments relate generally to marine vibrators for marine seismic surveys, and, more particularly, embodiments relate to the use of compliance chambers in marine vibrators, which may compensate for air-spring effects. As discussed in more detail below, the compliance chamber may shift the resonance frequency of the marine vibrator lower and may also increase the sound output at lower frequencies. Advantageously, the marine vibrators may display a low resonance frequency in the seismic frequency range of interest. In particular embodiments, the marine vibrators may display a first resonance frequency within the seismic frequency range of about 1 Hz to about 10 Hz when submerged in water at a depth of from about 0 meters to about 300 meters.

Marine vibrators may be used in marine seismic surveying to generate acoustic energy that may travel downwardly through water and downwardly into the subsurface rock. Embodiments of the marine vibrators may include flextensional shell-type marine vibrators, piston plate marine vibrators, hydraulically powered vibrators, electro-mechanical vibrators, electrical marine vibrators, and vibrators employing electrostrictive (e.g., piezoelectric) or magnetostrictive material. It is to be noted that unless specifically excluded, any disclosure regarding compliance chambers may be embodied by any of the embodiments of the type of marine vibrators discussed herein and that no embodiment of a compliance chamber is to be restricted to a specific type of marine vibrator.

Figure 1:
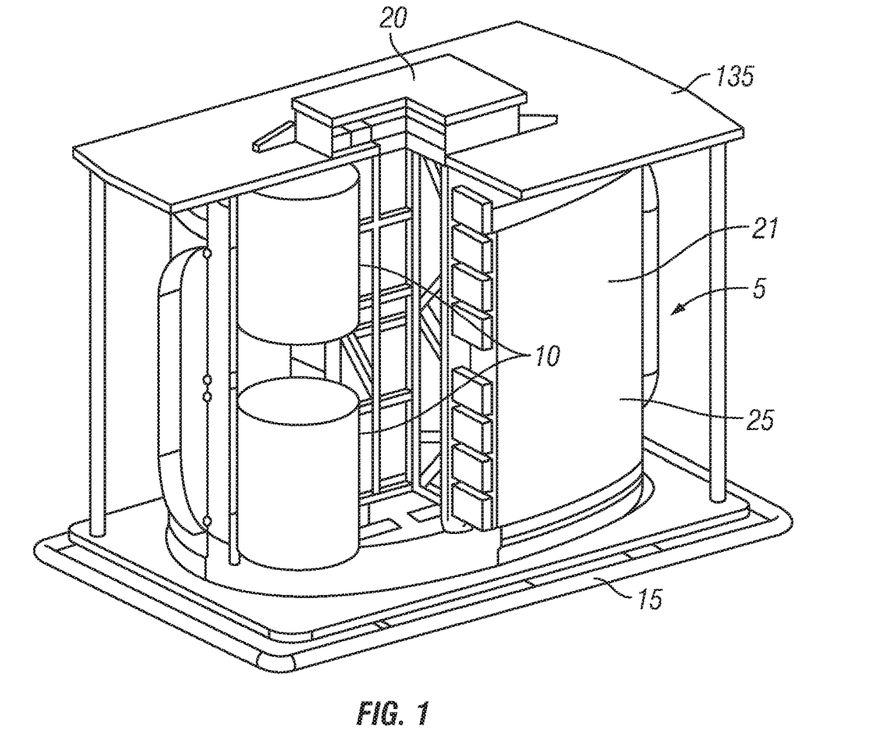
FIG. 1 illustrates an example embodiment of a flextensional shell-type marine vibrator comprising a compliance chamber.

Flextensional shell-type marine vibrators may include actuators and transducers and may act as mechanical transformers by transforming and amplifying the displacement to meet the demands of different applications. Flextensional shell-type marine vibrators are generally marine vibrators having an outer shell that moves back and forth and flexes to generate acoustic energy. An example embodiment of flextensional shell-type marine vibrator 5 is illustrated in FIG. 1. In the example embodiment, the flextensional shell-type marine vibrator 5 employs one or more compliance chambers 10, for example, to compensate for pressure changes of the internal gas pressure. The flextensional shell-type marine vibrator 5 of FIG. 1 is shown in partial cross-section. As illustrated, the flextensional shell-type marine vibrator 5 may be mounted within a frame 15. A bracket 20 may be mounted to the top of the frame 15. The bracket 20 may be used for deploying the flextensional shell-type marine vibrator 5 in a body of water. The flextensional shell-type marine vibrator 5 may comprise at least one sound radiating surface 21 as illustrated by outer shell 25. As illustrated, the compliance chambers 10 may be disposed within the outer shell 25. Alternatively, compliance chambers 10 may be disposed on the exterior of outer shell 25. While FIG. 1 illustrates two compliance chambers 10 disposed within the outer shell 25, it should be understood that the invention is applicable to the use of any number of compliance chambers 10 with a flextensional shell-type marine vibrator 5. By way of example, embodiments may include the use of one, two, three, four, or more compliance chambers 10 for the flextensional shell-type marine vibrator 5. In the illustrated embodiment, the outer shell 25 may be elliptical in shape or other suitable shape, including convex, concave, flat, or combinations thereof. While not illustrated, the outer shell 25 may be formed, for example, by two shell side portions that may be mirror images of one another.

Figure 2:
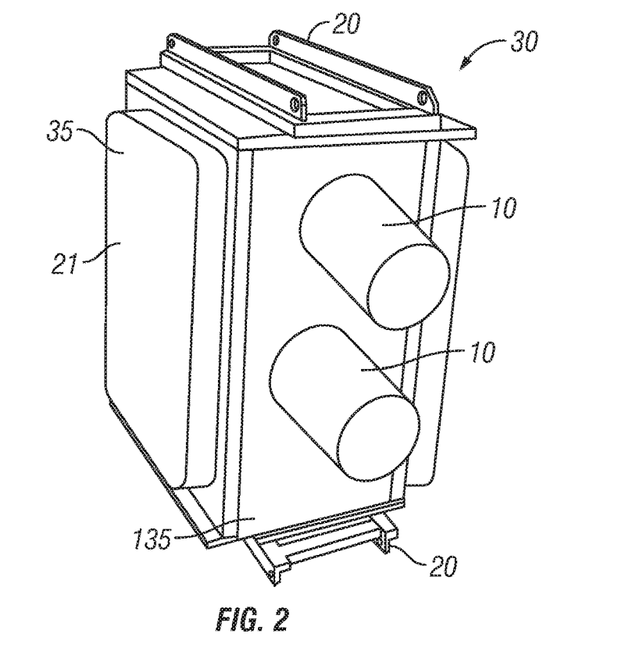
FIG. 2 illustrates an example embodiment of a piston plate-type marine vibrator comprising a compliance chamber.

Piston plate-type marine vibrators are generally marine vibrators having a piston plate that moves back and forth to generate acoustic energy. FIG. 2 is an example embodiment of a piston plate-type marine vibrator, illustrated as piston plate-type marine vibrator 30. As illustrated, piston plate-type marine vibrator 30 may comprise at least one sound radiating surface 21 and compliance chambers 10. The at least one sound radiating surface 21 is illustrated on FIG. 2 by piston plates 35. In the illustrated embodiment, compliance chambers 10 are disposed on the exterior of containment housing 135 of the piston plate-type marine vibrator 30. In alternative embodiments, compliance chambers 10 may be disposed on the interior of containment housing 135 of piston plate-type marine vibrator 30. While FIG. 2 illustrates two compliance chambers 10 disposed on the exterior of containment housing 135 of piston plate-type marine vibrator 30, it should be understood that the invention is applicable to the use of any number of compliance chambers 10 with a piston plate-type marine vibrator 30. By way of example, embodiments may include the use of one, two, three, four, or more compliance chambers 10 for the piston plate-type marine vibrator 30. Piston plate-type marine vibrator 30 may include brackets 20, which may be separately mounted on opposing sides of piston plate-type marine vibrator 30, or may be mounted on adjacent sides. Alternatively, only one bracket 20 may be used. Brackets 20 may be used for hoisting piston plate-type marine vibrator 30, for example when a deploying piston plate-type marine vibrator 30 in the water. By way of example, brackets 20 may facilitate attachment of piston plate marine vibrator 30 to tow lines, a survey vessel (e.g., survey vessel 155 on FIG. 8), or other suitable device or mechanism used in conjunction with disposing or towing piston plate-type marine vibrator 30 through a body of water.

Any of the marine vibrators (e.g., flextensional shell-type marine vibrator 5 on FIG. 1 and piston plate-type marine vibrator 30 on FIG. 2) discussed herein may have an internal gas pressure. By way of example, the marine vibrator may define an internal volume in which a gas may be disposed. The internal volume of a marine vibrator will be referred to herein as the "marine vibrator internal volume." In some embodiments, the marine vibrators may have a pressure compensation system. The pressure compensation system may be used, for example, to equalize the internal gas pressure of the marine vibrator with the external pressure. The internal gas pressure of the marine vibrator will be referred to herein as the "marine vibrator internal gas pressure." Pressure compensation may be used, for example, where a marine vibrator needs to be disposed (e.g., towed) at depth to achieve a given level of output. As the depth of a marine vibrator increases, the marine vibrator internal gas pressure may be increased to equalize pressure with the increasing external pressure. For example, a gas (e.g., air) or liquid (e.g., water) may be introduced into the marine vibrator to increase the marine vibrator internal gas pressure to approach and/or equalize pressure with the increasing external pressure. In some embodiments, the introduced gas or liquid may undergo a phase transition due to changing conditions within the marine vibrator (e.g., a change in pressure, temperature, etc.). Shifting the phase of matter may increase the marine vibrator internal gas pressure to approach and/or equalize the increasing external pressure.

Without being limited by theory, increasing the marine vibrator internal gas pressure may create an air-spring effect that may undesirably impact the resonance frequency of the marine vibrators. In particular, the resonance frequency may increase as the marine vibrator internal gas pressure increases. Those of ordinary skill in the art, with the benefit of this disclosure, should appreciate that an increase in the marine vibrator internal gas pressure may also result in an increase of the bulk modulus or air-spring effect of the gas (e.g., air) in the marine vibrator. Among other things, the resonance frequency of the marine vibrator may be based on the combination of the gas spring of the gas in the marine vibrator and the spring constant of any spring component of the marine vibrator (e.g., mechanical springs, nonmechanical springs, linear springs, non-linear springs, etc). Thus, increasing the bulk modulus or gas spring effect of the internal gas of a marine vibrator may also result in an increase in the resonance frequency. As such, the resonance frequency of a marine vibrator disposed at depth may undesirably increase when the marine vibrator internal gas pressure is compensated by equalization with the external pressure (e.g., by using a pressure compensation system).

To compensate for changes in the marine vibrator internal gas pressure, compliance chamber 10 may be employed. The compliance chamber 10 may contain a gas (e.g., air). The internal volume of compliance chamber 10 will be referred to herein as the "compliance chamber internal volume." The internal gas pressure of compliance chamber 10 will be referred to herein as the "compliance chamber internal gas pressure."

In some embodiments, compliance chamber 10 may comprise a sealed volume with a compliance chamber internal gas pressure of less than 1 atmosphere when at the water surface (less than about 1 meter depth). Alternatively, the compliance chamber internal gas pressure may be equal to or greater than atmospheric pressure when at the water surface. Further alternatively, the compliance chamber internal gas pressure may be equal to or lesser than atmospheric pressure when at the water surface. In present embodiments, when the marine vibrators are at operational depth, the compliance chamber internal gas pressure may be less than the marine vibrator internal gas pressure. In some embodiments, the marine vibrators may be operated, for example, at a depth of from about 1 meter to about 300 meters and, more particularly, from about 1 meter to about 100 meters.

Figure 3:
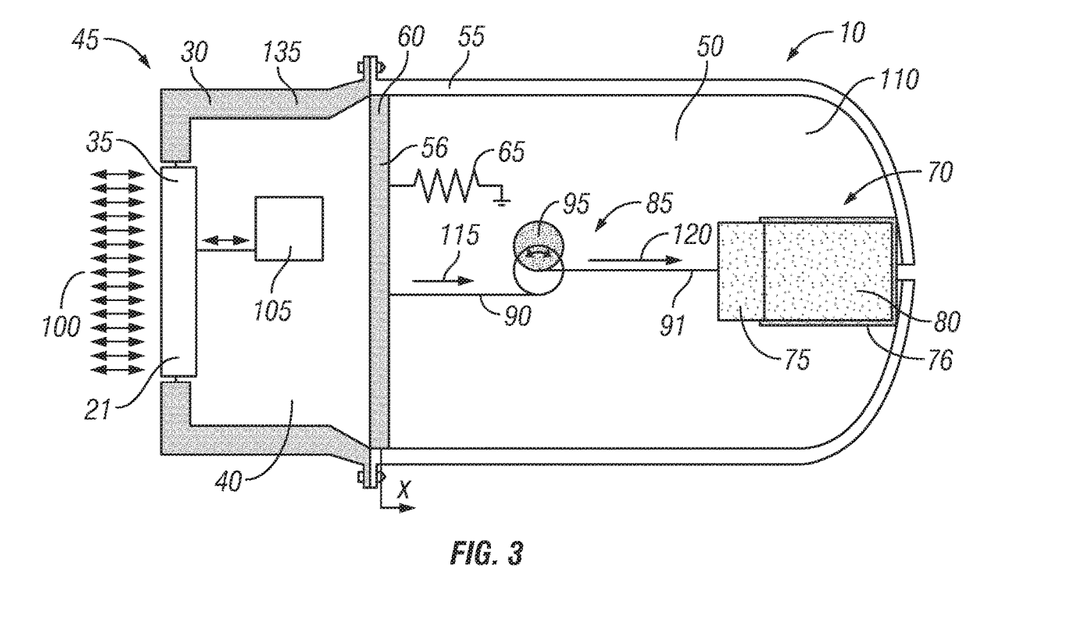
FIG. 3 illustrates an example embodiment of a marine vibrator comprising a compliance chamber.

In some embodiments, as illustrated in FIG. 3, a compliance chamber 10 may comprise at least one piston attached by an elastic component (e.g., a bellow (not shown) connected to a wall of the compliance chamber 10). In various embodiments, the pressurized gas within the marine vibrator internal volume can act on the outside of the compliance chamber piston 60, and a compressed gas within the compliance chamber internal volume can act from inside the compliance chamber 10 against the other side of the same piston. An example embodiment if this type of compliance chamber 10 is generally illustrated by FIG. 3. As illustrated, marine vibrator internal volume 40 is disposed within marine vibrator 45. As illustrated in FIG. 3, marine vibrator 45 comprises a piston plate-type marine vibrator 30. However, in alternative embodiments, marine vibrator 45 may be any type of marine vibrator including flextensional shell-type marine vibrator 5 as illustrated in FIG. 1. In the illustrated embodiment, marine vibrator internal volume 40 may contain a gas, such as air, to provide a marine vibrator internal gas pressure. Compliance chamber 10 may be in contact with marine vibrator internal volume 40. Compliance chamber 10 may be connected to containment housing 135 of marine vibrator 45 in any suitable manner. Compliance chamber 10 may have a compliance chamber internal volume 50, which may provide a compliance chamber internal gas pressure. In embodiments, compliance chamber internal volume 50 may contain a gas (e.g., air). In accordance with present embodiments, compliance chamber internal volume 50 may be sealed so as to not result in the chamber internal gas being in contact with any marine vibrator internal gas present in marine vibrator internal volume 40. In other embodiments, the compliance chamber internal gas pressure may be equal to or higher than the marine vibrator internal gas pressure.

As illustrated by FIG. 3, compliance chamber 10 may comprise a compliance chamber housing 55, a moveable structure 56, and an optional spring element 65. In some embodiments, compliance chamber internal volume 50 may be defined by compliance chamber housing 55 and a moveable structure 56 which comprises compliance chamber piston 60. Compliance chamber housing 55 may be made of any such suitable materials, including, without limitation, metals and plastics. Compliance chamber piston 60 may be slidable in compliance chamber housing 55 such that, when driven into or out of compliance chamber housing 55, the compliance chamber internal volume 50 may be changed. Compliance chamber piston 60 may be designed with sufficient displacement in compliance chamber housing 55 to compensate for a change in marine vibrator internal gas pressure, for example, due to a change in depth and/or any change in marine vibrator internal volume 40 due to the operation of a marine vibrator 45. The compliance chamber piston 60 may be sealed in compliance chamber housing 55, for example, with an O-ring, rubber seal, piston rings, bellows, etc. Compliance chamber piston 60 may be a disk, cylindrical element, or any configuration suitable to effect a desired compliance chamber internal volume change in compliance chamber housing 55. For example, compliance chamber piston 60 may have a different configuration, including square, rectangular, or oblong, among others. In some embodiments, compliance chamber piston 60 may be loaded in compliance chamber housing 55 with spring element 65.

Spring element 65 may be tuned to form a resonant system together with the mass of the compliance chamber piston 60, enabling a resonance close to the desired resonance of the marine vibrator. In optional embodiments, spring element 65 may be a linear spring. As illustrated in FIG. 3, in optional embodiments, spring element 65 may be disposed within compliance chamber internal volume 50 and attached to compliance chamber piston 60. Spring element 65 may be any spring suitable for creating a resonant system formed by the compliance chamber piston 60 mass, the mass of its load, the air spring, and said spring element 65. Spring element 65 may be used to obtain a marine vibrator 45 resonance frequency that is almost independent of depth. Spring element 65 may also have a biasing effect, enabling the compliance chamber internal pressure to differ from marine vibrator internal pressure. By way of example, spring element 65 may be a compression spring, a torsion spring, and the like.

With continued reference to FIG. 3, compliance chamber 10 may further comprise a low pressure chamber 70 and a non-linear linkage assembly 85. Low pressure chamber 70 may comprise a low pressure piston 75 and a low pressure chamber housing 76 which define a low pressure chamber internal volume 80 having a low pressure chamber internal gas pressure. Low pressure chamber internal volume 80 comprises a low pressure relative to the compliance chamber internal gas pressure and the marine vibrator internal gas pressure. "Low pressure" when used in the context of low pressure chamber 70 and low pressure piston 75 is defined as a pressure that is a maximum of 50% of the pressure on the high pressure side of the low pressure piston. Specifically, the low pressure chamber internal volume will comprise a pressure that does not exceed 50% of the pressure on the other side of the low pressure piston or put in another way, the low pressure chamber 70 will comprise an internal pressure that does not exceed 50% of the pressure external to the low pressure chamber 70. Low pressure piston 75 may be connected to moveable structure 56, which as illustrated in FIG. 3 is compliance chamber piston 60. The connection between low pressure piston 75 and compliance chamber piston 60 may be any such connection suitable for affixing one to the other such that the movement of one may influence the movement of the other.

As illustrated by FIG. 3, low pressure piston 75 may be connected to moveable structure 56 by a non-linear linkage assembly 85. Non-linear linkage assembly 85 may be any such linkage assembly that links low pressure piston 75 and moveable structure 56 in a non-linear relationship. In this specific embodiment, non-linear linkage assembly 85 comprises low pressure chamber belt 91, moveable structure belt 90, and camshaft 95. The low pressure chamber belt 91 may be coupled to camshaft 95 and low pressure piston 75 in any manner. Moveable structure belt 90 may be coupled to camshaft 95 and moveable structure 56 (e.g., compliance chamber piston 60) in any manner. Low pressure chamber belt 91 and moveable structure belt 90 may be made of any materials sufficient for the applications described herein. Examples of materials may include, but should not be limited to plastics such as natural and synthetic rubbers, steel, KEVLAR®, and the like. KEVLAR® is a registered trademark of the E. I. du Pont de Nemours and Company, of Wilmington, Del. The materials may be elastic or nonelastic. The stiffness of the material may affect the force applied and the material should be selected accordingly. In alternative embodiments, low pressure chamber belt 91 and moveable structure belt 90 may be substituted for a piston rod (not shown). Camshaft 95 may be any camshaft suitable for translating the displacement of low pressure piston 75 as low pressure piston 75 moves inward into low pressure chamber internal volume 80 to a force necessary to assist in pulling moveable structure 56 inward into compliance chamber internal volume 50. Although FIG. 3 specifically illustrates a camshaft 95, it is to be understood that any structure or mechanical linkage capable of transferring the driving performed by low pressure piston 75 to a force sufficient to move moveable structure 56 may be used.

Operation of compliance chamber 10, as shown in FIG. 3, will now be described in accordance with the example embodiment. Compliance chamber 10 may operate due to a change in the pressure differential across moveable structure 56 (illustrated by compliance chamber piston 60 in FIG. 3) between the marine vibrator internal volume 40 and the compliance chamber internal volume 50. By way of example, the change in the pressure differential may be caused by an increase in the marine vibrator internal gas pressure due to increased depth and/or the acoustic operation of marine vibrator 45. For example, sound radiating surface 21 comprising piston plate 35 may move back and forth (as illustrated by arrows 100) to generate acoustic vibrations. In the illustrated embodiment, movement of piston plate 35 may be induced by an actuator 105. The resulting force due to the pressure differential between the marine vibrator internal volume 40 and the compliance chamber internal volume 50 may result in compliance chamber piston 60 being displaced into compliance chamber internal volume 50. Such a displacement may increase the pressure within compliance chamber internal volume 50. This pressure increase may result in a counteracting force acting on compliance chamber piston 60 from within the compliance chamber 10. The counteracting force results from the compression of the gas within compliance chamber 10. This compressed gas force will be referred to herein as the chamber gas spring 110 (e.g., an air spring). The counteracting force may act in tandem with optional spring element 65 if spring element 65 is provided. The chamber gas spring 110 and, if present, optional spring element 65, may have a positive spring rate (a measurement of amount of force required to deflect a spring a specified distance; a lower spring rate corresponds with a softer spring). The force exerted by the chamber gas spring 110 and, if present, optional spring element 65, may increase as the compliance chamber piston 60 is moved further into compliance chamber 10, thus displacing more of the compliance chamber internal volume 50. The force exerted on the compliance chamber piston 60 may be approximately proportional to the marine vibrator internal gas pressure in the marine vibrator 45, since the compliance chamber 10 may be operated with a pressure slightly higher than the marine vibrator internal gas pressure in the marine vibrator 45.

In order to maintain the pressure in marine vibrator internal volume 40 nearly constant regardless of the marine vibrator internal volume displacement, and therefore keep the marine vibrator internal gas pressure independent of the compliance chamber piston 60 position, a force balance on the moveable structure 56 may be used to assist in pulling the moveable structure 56 inward. Without such force, moveable structure 56 may get stiffer as it moved inward. A correction force described herein as force A and identified by reference marker 115 may be applied to the compliance chamber piston 60 (i.e. moveable structure 56) via non-linear linkage assembly 85 (or any similar mechanism) connected to low pressure piston 75. Force A 115 may increase as the compliance chamber piston 60 displaces more of compliance chamber internal volume 50. The force-versus-displacement function of force A 115 may correspond to a spring with negative spring rate. Said force A 115 may, for any given displacement X of compliance chamber piston 60 (i.e. moveable structure 56), cancel the force increase caused by the compression of the chamber gas spring 110. As a result, the marine vibrator internal gas pressure may remain almost constant independent of piston plate 35 displacement. Thus, the variation in effective stiffness due to depth variations and therefore the marine vibrator internal gas pressure may be reduced. The resonance frequency may be directly related to the effective spring stiffness. Stiffness effects (i.e., the air-spring effect) on the marine vibrator 45 resonance frequency may be reduced.

Force B 120 is a force generated by low pressure piston 75 as low pressure piston 75 moves into low pressure chamber 70, driven by the pressure of chamber gas spring 110. Said movement decreases the volume of low pressure chamber internal volume 80 and at the same time increases the volume of compliance chamber internal volume 50. As desired, the gear-versus-displacement function of the non-linear linkage assembly 85 may be used to ensure that the force B 120 generated by displacement of low pressure piston 75 is converted to provide a desired amount of corrective force (i.e. force A 115) using a non-linear gear. For example, in this embodiment, camshaft 95 may be adjusted as desired to suit the application. The low pressure piston generated force of Force B 120, which is the force on the low pressure chamber belt 91, will increase as the pressure inside compliance chamber 10 increases. When the operation of marine vibrator 45 is initiated, low pressure piston 75 may move slowly as compliance chamber piston 60 moves inward into compliance chamber internal volume 50, but may accelerate the further compliance chamber piston 60 moves inward into compliance chamber internal volume 50. This is due to the non-linear relationship between compliance chamber piston 60 and low pressure piston 75. In this embodiment, the mechanical coupling between compliance chamber piston 60 and low pressure piston 75 is not proportional: the two move in a non-linear relationship due to the non-linear linkage assembly 85 which links the displacement of low pressure piston 75 with the displacement of compliance chamber piston 60. The volume displacement of the compliance chamber piston 60 may be approximately equal to the volume displacement of the sound radiating surface 21, and the relationship in movement between the sound radiating surface 21, and the low pressure piston 75 would, therefore, be non-linear. As illustrated, the use of the low pressure piston 75 as a force generator (i.e. it generates low pressure piston force, Force B 120) placed inside the compliance chamber internal volume 50 may result in Force B 120 changing when pressure is changing in the compliance chamber internal volume 50 due to the compression of the chamber gas spring 110. As such, a force generated on moveable structure 56 (e.g., sound radiating surface 21) by the marine vibrator internal gas pressure and/or the chamber gas spring 110 may be mitigated. During a compression cycle, the temperature of any gas in the compliance chamber internal volume 50 may increase due to the rapidity with which the compliance chamber internal volume 50 may be altered by the movement of compliance chamber piston 60. For a compression stroke, the pressure increase can be close to an adiabatic process, for example, if the compliance chamber piston 60 is left in its most displaced state, the system can initially be in balance, if a particular gear-ratio has been selected to allow for this state. As such, the compliance chamber internal gas pressure may decrease when the gas comprising the chamber gas spring 110 cools. Thus, the low pressure piston generated force of Force B 120 may decrease as the gas within the compliance chamber internal volume 50 cools, maintaining a force balance on compliance chamber piston 60.

The example illustrated by FIG. 3 may work with an internal gas, such as air, at a pressure close to the hydrostatic pressure surrounding the marine vibrator 45. When the marine vibrator 45 is exposed to increasing pressure, due to increasing water depth, the correction force of force A 115 may increase proportionally. The pressure in the compliance chamber 10 may be kept at a pressure close to the outside water pressure at the depth of operation. For example, when the depth is increased, so is the pressure in the compliance chamber 10. As such, a larger force A 115 may be needed at larger depths in order to maintain a force balance on compliance chamber piston 60 when the moveable structure 56 is pushed inwards compressing the compliance chamber internal gas and increasing the chamber gas spring 110. The low pressure piston 75 may generate proportionally more force as pressure is increased in the compliance chamber 10, assuming that the pressure in low pressure chamber 70 is low (i.e., approaching a vacuum). Thus, this functionality allows for operation of marine vibrator 45 at different depths, and as such, marine vibrator 45 does not need to be maintained at a constant depth in order to function. For example, in an embodiment, a marine vibrator operated at a first depth and having a first resonance frequency may then be moved and operated at a second depth greater than the first depth and have a second resonance frequency. In this example, the marine vibrator internal gas pressure may be allowed to act on the low pressure piston 75 such that the first resonance frequency differs from the second resonance frequency by no more than 25%. For example, the first resonance frequency may differ from the second resonance frequency by no more than 20%, by no more than 15%, by no more than 10%, or by no more than 5%.

In embodiments, the marine vibrator 45 may be towed through a body of water over a subterranean formation. A seismic signal may be generated from the sound radiating surface 21 of the marine vibrator 45 as it is actuated. The seismic signal may comprise a specific resonance frequency. The resonance frequency generated will have a peak power at a specific resonance frequency. The power (e.g., Watt, decibel, etc.) of the seismic signal will determine the degree to which it is able to penetrate the subterranean formation, and thus, the modified seismic signal detected by the marine vibrator 45 is influenced by the power of the seismic signal and thus the resonance frequency of the seismic signal. In embodiments, the resonance frequency and thus the power of the seismic signal may be adjusted by the adjustment of the marine vibrator internal gas pressure. As described in FIG. 3, the adjustment of the marine vibrator internal gas pressure may be accomplished by allowing the marine vibrator internal gas pressure to act on the low pressure piston 75 of the low pressure chamber 70. Thus, as the depth of the marine vibrator 45 is altered, the low pressure chamber 70 allows for control of the power output of the seismic signal independent of depth. In embodiments, this may allow the marine vibrator 45 to attain a peak power output at two different depths, wherein the peak power output is a power associated with a resonance frequency in the seismic frequency range of interest (i.e. about 1 Hz to about 10 Hz).

Figure 4:
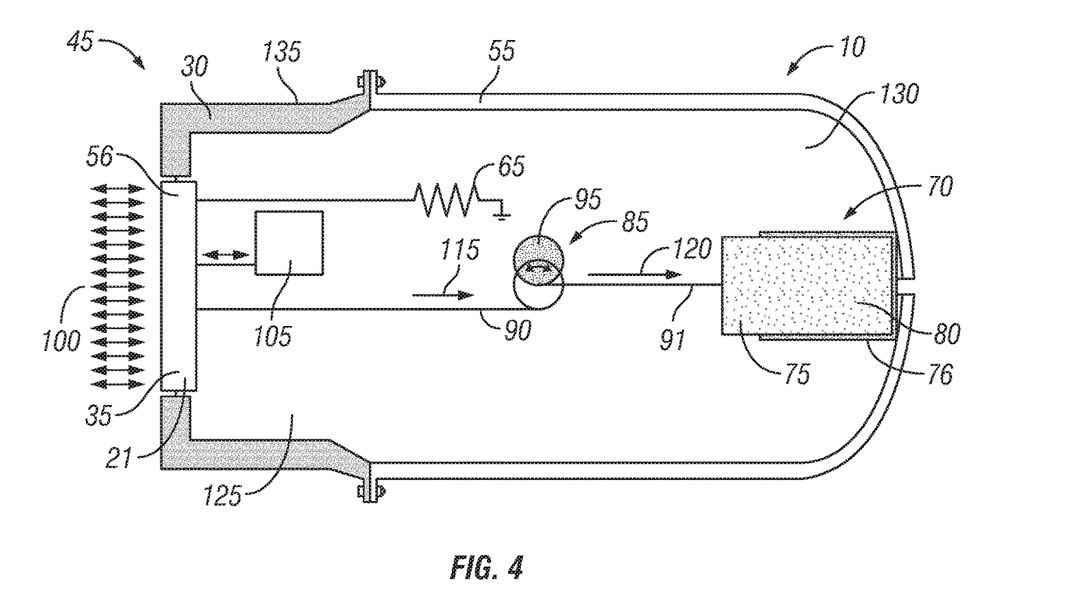
FIG. 4 illustrates another example embodiment of a marine vibrator comprising a compliance chamber.

FIG. 4 illustrates an example marine vibrator 45 and compliance chamber 10 that is similar to the example of FIG. 3 except that the moveable structure 56 illustrated in FIG. 4 comprises piston plate 35 and not compliance chamber piston 60, which is not included in this specific example. As illustrated marine vibrator 45 and compliance chamber 10 now share an internal volume, noted as combined internal volume 125. Since there is no partition between the marine vibrator 45 and compliance chamber 10, there is only one internal gas pressure and thus one gas spring (e.g., an air spring), noted as combined gas spring 130. As illustrated, non-linear linkage assembly 85 couples piston plate 35 to low pressure piston 75 via low pressure chamber belt 91, moveable structure belt 90, and camshaft 95. An optional spring element 65 may also be affixed to piston plate 35. In FIG. 4, combined gas spring 130 acts on piston plate 35 as piston plate 35 is displaced inward due to movement of the actuator 105 or external pressure. In order to keep the force of the actuator 105 acting on the piston plate 35 independent of the piston plate 35 position, force A 115 may be applied to the piston plate 35 via moveable structure belt 90, said force A 115 being driven by the displacement of camshaft 95 and low pressure piston 75 as low pressure piston 75 moves inward into low pressure chamber internal volume 80 and thus pulls low pressure chamber belt 91. This mechanism is analogous to that described above in FIG. 3. Thus, force A 115 may increase as the piston plate 35 displaces more of the combined internal volume 125. The force-versus-displacement function of force A 115 may correspond to a spring with negative spring rate. For example, a displacement X of the sound radiating surface 21 may cancel the force increase caused by the compression of the combined gas spring 130. As a result, the air-spring effect may be reduced, resulting in less variation on the marine vibrator 45 resonance frequency as a function of depth/pressure.

Force B 120 is a force generated by low pressure piston 75 as low pressure piston 75 moves into low pressure chamber 70, displacing an increasing volume of low pressure chamber internal volume 80. The low pressure piston 75 is driven mainly by the pressure inside the combined internal volume 125. As desired, the gear-versus-displacement function of the non-linear linkage assembly 85 may be used to ensure that the force B 120 generated by displacement of low pressure piston 75 and the camshaft 95 is converted to provide a desired amount of force A 115. For example, in this embodiment, camshaft 95 may be adjusted as desired to suit the application. Force B 120, which is the force on the low pressure chamber belt 91, will increase as the combined gas spring 130 increases. When the operation of marine vibrator 45 is initiated, low pressure piston 75 may move slowly as sound radiating surface 21 moves inward into combined internal volume 125, but may accelerate the further sound radiating surface 21 moves inward into combined internal volume 125. This is due to the non-linear relationship between sound radiating surface 21 and low pressure piston 75. In this embodiment, sound radiating surface 21 and low pressure piston 75 are physically coupled together, and the two exist in a non-linear relationship due to the non-linear linkage assembly 85, which links the displacement of low pressure piston 75 with the displacement of sound radiating surface 21. As illustrated, the use of the low pressure piston 75 as a force generator placed inside the combined internal volume 125 may result in force B 120 changing when pressure is changing in the combined internal volume 125 due to the compression of the combined gas spring 130. As such, a force generated on moveable structure 56 (e.g., sound radiating surface 21) by the marine vibrator internal gas pressure and/or the compliance chamber internal gas pressure may be mitigated. During a compression cycle, the temperature of any gas in the combined internal volume 125 may increase due to the rapidity with which the combined internal volume 125 may be altered by the movement of moveable structure 56 (i.e., sound radiating surface 21, and in this specific embodiment, piston plate 35). For a compression stroke, the pressure increase can be close to an adiabatic process, for example, if the moveable structure 56 is left in its most displaced state, the system can initially be in balance, if a particular gear-ratio has been selected to allow for this state. As such, the chamber internal pressure may decrease when the gas comprising the combined gas spring 130 cools. Thus, force B 120 may decrease as the gas within the combined internal volume 125 cools, maintaining a force balance on piston plate 35.

Figure 5A:
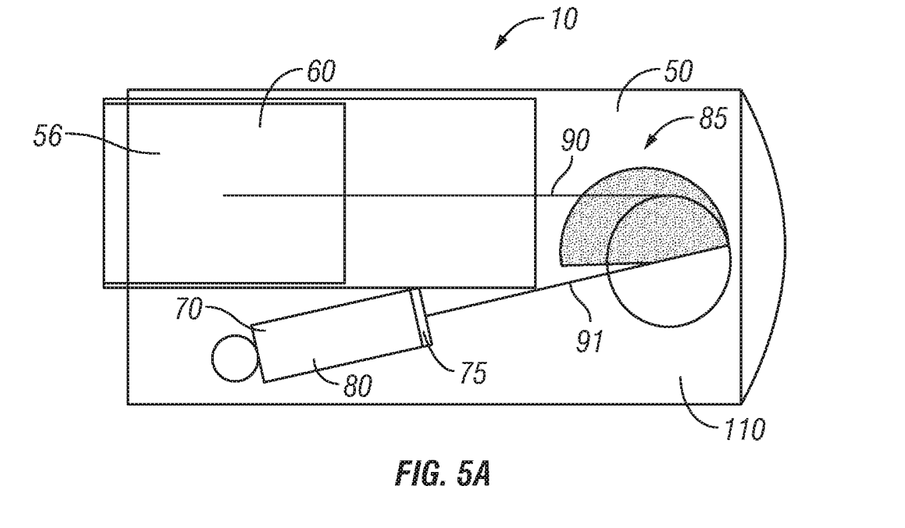
FIG. 5A illustrates an example embodiment of a compliance chamber.
Figure 5B:
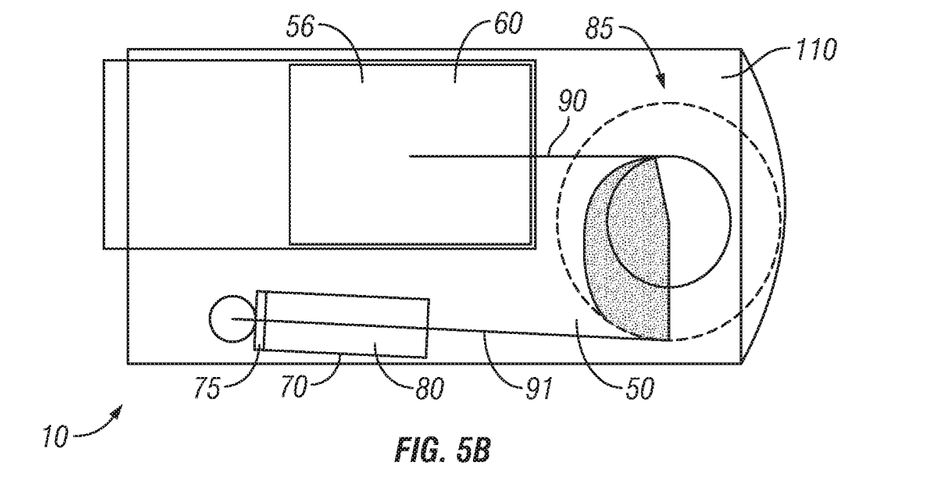
FIG. 5B illustrates an example embodiment of a compliance chamber.

FIGS. 5A and 5B illustrate an example option for an arrangement of the components within a compliance chamber 10. FIGS. 5A and 5B also illustrate the action of a non-linear linkage assembly 85 by further illustrating the movement of a moveable structure belt 90, camshaft 95, and low pressure chamber 91 belt within this example arrangement. The compliance chamber 10 of FIGS. 5A and 5B may be analogous in function to the compliance chamber 10 of FIG. 3, but with the structural components arranged in a different orientation. FIG. 5A illustrates moveable structure 56, illustrated in FIG. 5A as comprising compliance chamber piston 60 in an initial starting position where compliance chamber piston 60 is displacing a minimum amount of marine vibrator internal volume 40 (not shown). In an analogous fashion to FIGS. 3 and 4, it is the actuator (not shown) moving the piston plate, or other sound radiating surface (not shown), that moves the gas in the marine vibrator internal volume (not shown) and causes the compliance chamber piston 60 to move inward as illustrated by FIG. 5B which compresses the chamber gas spring 110. As the marine vibrator internal gas pressure increases, low pressure piston 75 may displace at least a portion of low pressure chamber internal volume 80, as illustrated in FIG. 5B. As low pressure piston 75 moves, moveable structure belt 90, low pressure chamber belt 91, and camshaft 95, which couple the low pressure piston 75 to the moveable structure 56 in a non-linear relationship, operate to exert a force on moveable structure 56. As described above, such movement may provide a counteracting force to the increase of the chamber gas spring 110 due to compression of compliance chamber internal volume 50 by movement of compliance chamber piston 60. As such, the marine vibrator internal gas pressure may be maintained almost independent of the compliance chamber piston 60 position, and the marine vibrator internal gas pressure is kept near constant. Thus, the internal marine vibrator internal gas pressure may remain near constant independent of depth, and stiffness effects (i.e., the air-spring effect) on the marine vibrator 45 resonance frequency may be reduced.

Figure 6A:
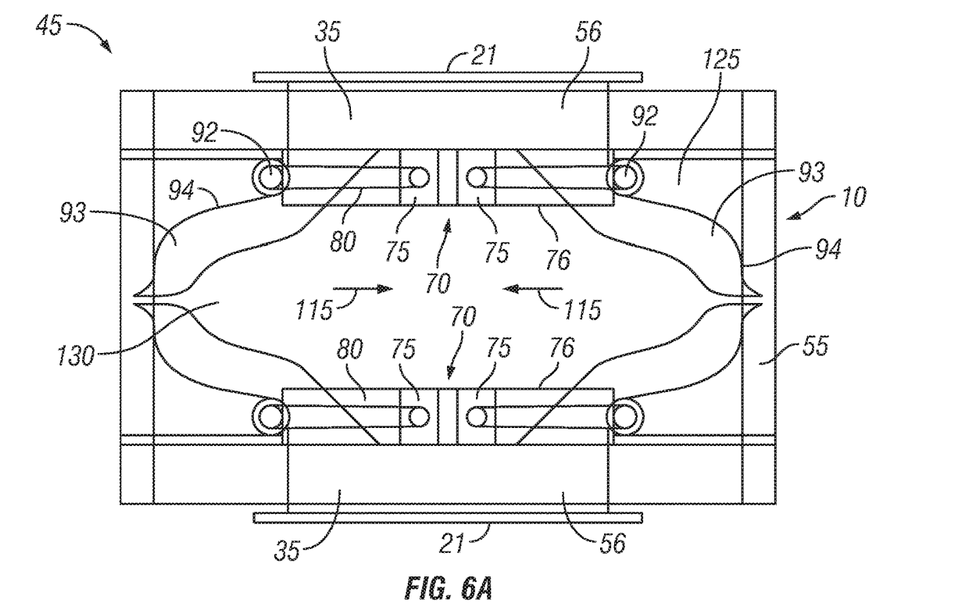
FIG. 6A illustrates an example embodiment of a marine vibrator comprising a low pressure piston.
Figure 6B:
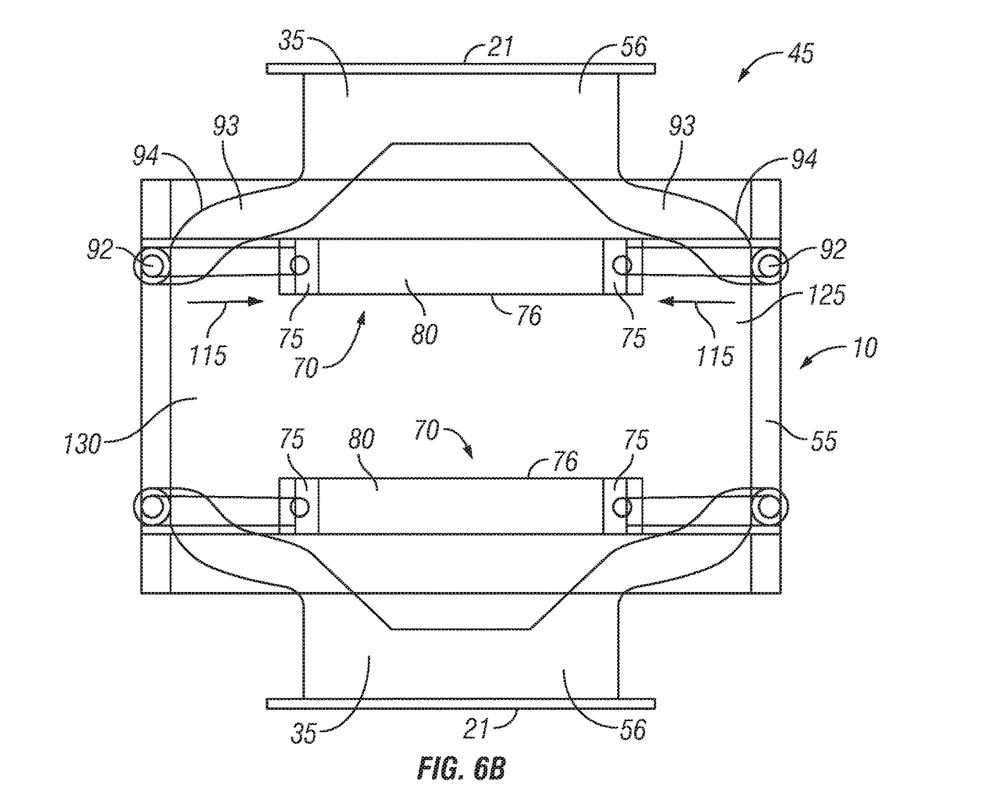
FIG. 6B illustrates an example embodiment of a marine vibrator comprising a low pressure piston.

FIGS. 6A and 6B illustrate an additional embodiment of a piston plate-type marine vibrator 30 as shown in FIGS. 3 and 4, but using a different non-linear linkage assembly 85. The moveable structures are coupled to low pressure piston 75 via the non-linear linkage assembly 85, and a similar effect is produced by the coupling as was described in FIGS. 3 and 4. However, in this specific embodiment, the non-linear linkage assembly 85 does not comprise moveable structure belt 90, low pressure chamber belt 91, and camshaft 95. As a substitute for these components, non-linear linkage assembly 85 comprises ball bearings 92 and ribs 93. Ribs 93 may be a component of moveable structure 56, or may be attached to moveable structure 56. As the pressure within the combined volume 125 increases, low pressure piston 75 moves inward into low pressure chamber 70, displacing at least a portion of low pressure chamber internal volume 80, generating force A 115. Ball bearings 92 interact with moveable structure ribs 93 to pull moveable structure 56 inwards. The slope of moveable structure ribs 93 may be altered to achieve the desired gear-versus-displacement function in an analogous fashion to the alteration of the camshaft 95 described above in FIGS. 3-5B. FIG. 6A depicts the moveable structure 56 moved completely inwards. FIG. 6B depicts the moveable structure 56 extended completely outwards. As shown in FIG. 6B the slope of the exterior surface 94 of the moveable structure ribs 93 is approaching infinity at the base of the moveable structure ribs 93 where the exterior surface 94 contacts the ball bearings 92. Ball bearings 92, rather than rolling on the moveable structure ribs 93, instead merely pull against the moveable structure ribs 93 as low pressure piston 75 moves inward into low pressure chamber internal volume 80, without generating an inwards pulling force on moveable structure 56. However, should a sufficient amount of force against the exterior of moveable structure 56 be applied, for example by an actuator (not shown for simplicity), moveable structure 56 may move downward, and consequently movable structure ribs 93 may also move downward into the combined internal volume 125. As movable structure ribs 93 move downward into combined internal volume 125, the slope of movable structure ribs 93 no longer approaches infinity, and the exterior surface 94 may comprise a slope with which ball bearings 92 may interact. Ball bearings 92 may then roll on exterior surface 94 of moveable structure ribs 93, pushing moveable structure 56 downwards into the combined internal volume 125 as low pressure piston 75 moves into low pressure chamber 70, displacing at least a portion of low pressure chamber internal volume 80. Moveable structure 56 may continue to move inwards, and may ultimately reach the position shown in FIG. 6A. Thus, a force balance may be maintained on moveable structure 56, and the marine vibrator internal gas pressure may remain constant independent of depth, and stiffness effects (i.e., the air-spring effect) on the marine vibrator 45 resonance frequency may be reduced.

With reference to FIGS. 3-6B, in some examples, for the compliance chamber 10 to mitigate stiffness effects within marine vibrator 45, the compressed gas spring elements (either chamber gas spring 110 or combined gas spring 130) and also spring element 65, if present, and the applied correction force, force A 115 may be stiff enough such that the system may be balanced with the current water and/or gas pressure at actual operating depths and also be compliant enough to follow the displaced volume variations of the sound radiating surfaces 21 of the marine vibrator 45. When the sound generating surfaces 21 of the marine vibrator 45 displace a volume, the compliance chamber 10 described herein may function such that the compliance chamber 10 follows the changes of the displaced volume and the marine vibrator internal volume 40 and the marine vibrator internal gas pressure are held nearly constant.

The correction force, force A 115, in FIGS. 3-6B, may be proportional to the pressure difference across the moveable structure 56. In some examples of the present disclosure, if the pressure is approximately equal on both sides of moveable structure 56, no correction force, force A 115, may be necessary. As previously noted, the resonance frequency at operational depth may be increased since the mass is forming a tuned system together with a stiff spring. By increasing the pressure in the low pressure chamber internal volume 80, the differential pressure across the low pressure piston 75 may decrease. This differential pressure decrease may result in an increase of the effective spring stiffness acting on moveable structure 56 in FIGS. 3-6B. Thus, the mechanical resonance frequency of a marine vibrator 45 may, at a given depth, be changed by changing the pressure differential across low pressure piston 75. Therefore, when a marine vibrator 45 operates at a low frequency, the wavelength may be significantly larger than the dimensions of the vibrator, the pressure and velocity may not be in phase on the sound radiating surface 21, and the water load may be reactive. As such, the transducer displacement may be maximized in order to generate sufficient acoustic energy. Transmission of, for example, a chirp signal may be done at resonance throughout the transmission pulse by changing the pressure differential across low pressure piston 75 as transmission progresses.

The non-linear linkage between the low pressure piston 75 in FIGS. 3-6B and the movable structures 56 may be realized in many different ways using any combination of rollers, wheels, bearing, curved surfaces, belts, metal bands, wires, ropes, etc. For example, rollers fitted on the movable structure 56 may roll directly onto a curved camshaft surface, rather than a camshaft 95 and a movable structure 56 being interconnected (e.g., with belts).

In accordance with example embodiments, external energy sources may not be required for operation of the compliance chamber 10. Instead, embodiments of the compliance chamber 10 may operate due to a change in pressure differential (e.g., across a moveable structure 56, low pressure piston 75, etc.) between cavities, chambers, bodies of water, etc. with different internal pressures.

With reference to FIGS. 1-6B, compliance chamber 10 may be disposed on a flextensional shell-type marine vibrator 5 as shown in FIG. 1, a piston plate-type marine vibrator 30 as shown in FIGS. 2, 3, 4, 6A, and 6B or on any other type of marine vibrator 45 by being coupled to containment housing 135 of marine vibrator 45. Compliance chamber 10 may be in contact with marine vibrator internal volume 40 through an opening, port, window, or the like in containment housing 135. Containment housing 135 may at least partially define marine vibrator internal volume 40. However, contact between marine vibrator 45 and compliance chamber 10 does not imply that any liquid or gas residing in either marine vibrator 45 or compliance chamber 10 is able to pass into the other, as illustrated by FIGS. 3, 5A, and 5B. The marine vibrator internal gas and the chamber internal gas may not be mixed, and as such are not exposed to one another. Similarly, the marine vibrator internal volume 40 and compliance chamber internal volume 50 may be not mixed, and as such are not exposed to one another. In alternative embodiments, however, the volumes and internal gas or gases of the marine vibrator 45 and the compliance chamber 10 may be in contact with each and also may be mixed, as illustrated in FIGS. 4, 6A, and 6B. In all embodiments of the compliance chamber 10, changes in the marine vibrator internal gas pressure may effect a change in the compliance chamber internal gas pressure, and vice versa. Compliance chamber 10 may be disposed on the exterior of any part of containment housing 135. In alternative embodiments, compliance chamber 10 may be disposed on the interior of containment housing 135 of any type of marine vibrator 45. Compliance chamber 10 may be coupled to containment housing 135 using any sufficient means, for example, a threaded connection. Compliance chamber 10 may be in contact with marine vibrator internal volume 40 through a hole, opening, port, or the like in containment housing 135.

In some embodiments, marine vibrator 45 may produce at least one resonance frequency between about 1 Hz to about 200 Hz when submerged in water at a depth of from about 0 meters to about 300 meters. In alternative embodiments, marine vibrator 45 may display at least one resonance frequency between about 0.1 Hz and about 100 Hz, alternatively, between about 0.1 Hz and about 10 Hz, and alternatively, between about 0.1 Hz and about 5 Hz when submerged in water at a depth of from about 0 meters to about 300 meters. Marine vibrator 45 may be referred to as a very low frequency source where it has at least one resonance frequency of about 10 Hz or lower.

Figure 7:
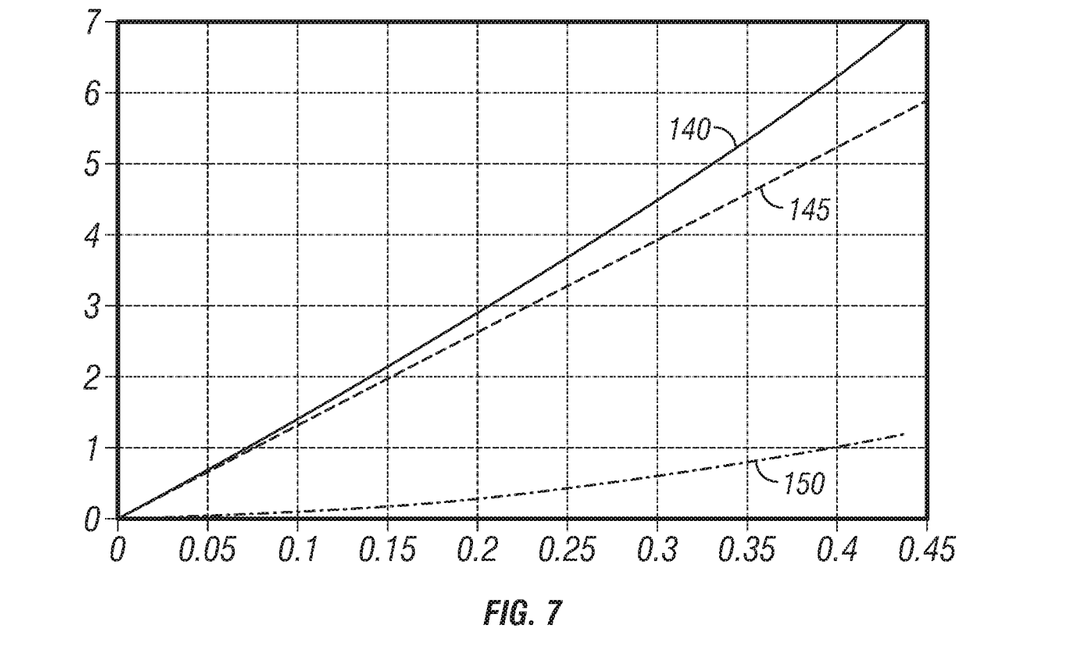
FIG. 7 is a graph that plots the work-versus-displacement function of a marine vibrator in accordance with example embodiments.

FIG. 7 illustrates a graph plotted as a function of vibrator displacement (x-axis) in accordance with the embodiments of the present disclosure. The work (y-axis) needed to compress a given volume of gas in a gas spring (e.g., chamber gas spring 110 in FIGS. 3, 5A, and 5B, or combined gas spring 130 in FIGS. 4, 6A, and 6B) is illustrated by the uppermost curve 140. The middle curve 145 represents the work carried out by displacing a given volume of gas at a constant pressure. The lowermost curve 150 represents the work supplied by the correction force. A low pressure chamber (e.g. low pressure chamber 70 in FIGS. 3-5B) may be used to generate the required force and the related work.

Figure 8:
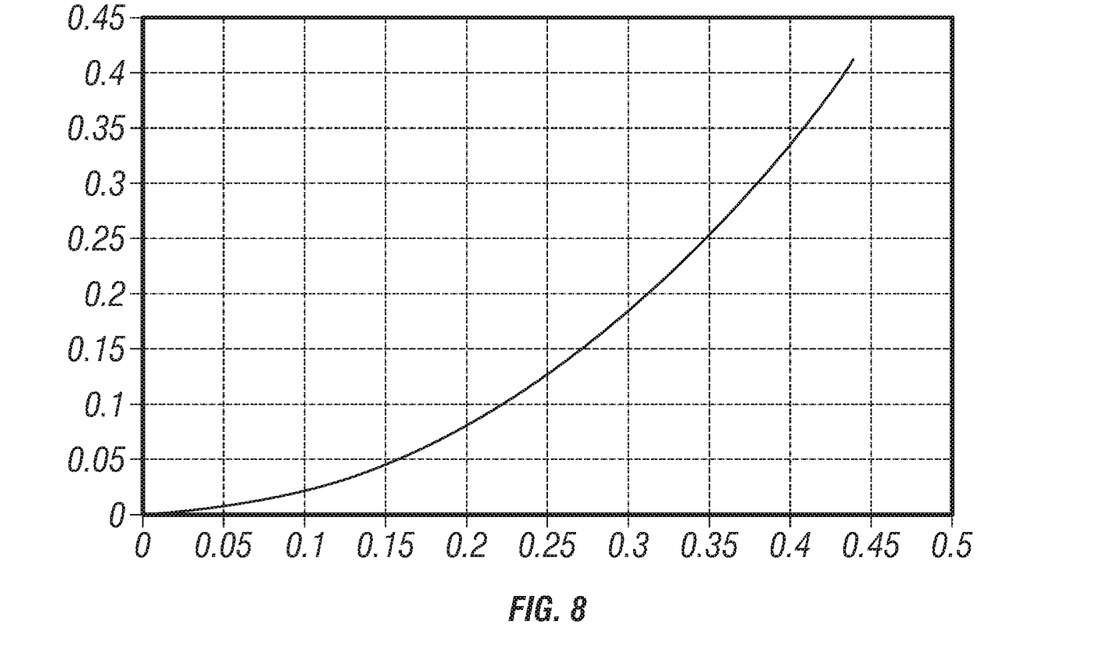
FIG. 8 is a graph that plots the relationship between the movement of a moveable structure and the movement of a low pressure piston as a function of displacement.

FIG. 8 illustrates a graph of an example of the desired relationship between the movement of the moveable structure 56 (x-axis) and the low pressure piston 75 (y-axis) as a function of displacement. The displacement of the low pressure piston 75 may be represented as a non-linear function of the moveable structure 56 displacement. The non-linear function may be implemented by using a non-linear linkage assembly 85, where the gear-versus-displacement function may be configured so that the desired relationship in displacement between the low pressure piston 75 and the moveable structure 56 is obtained.

Figure 9:
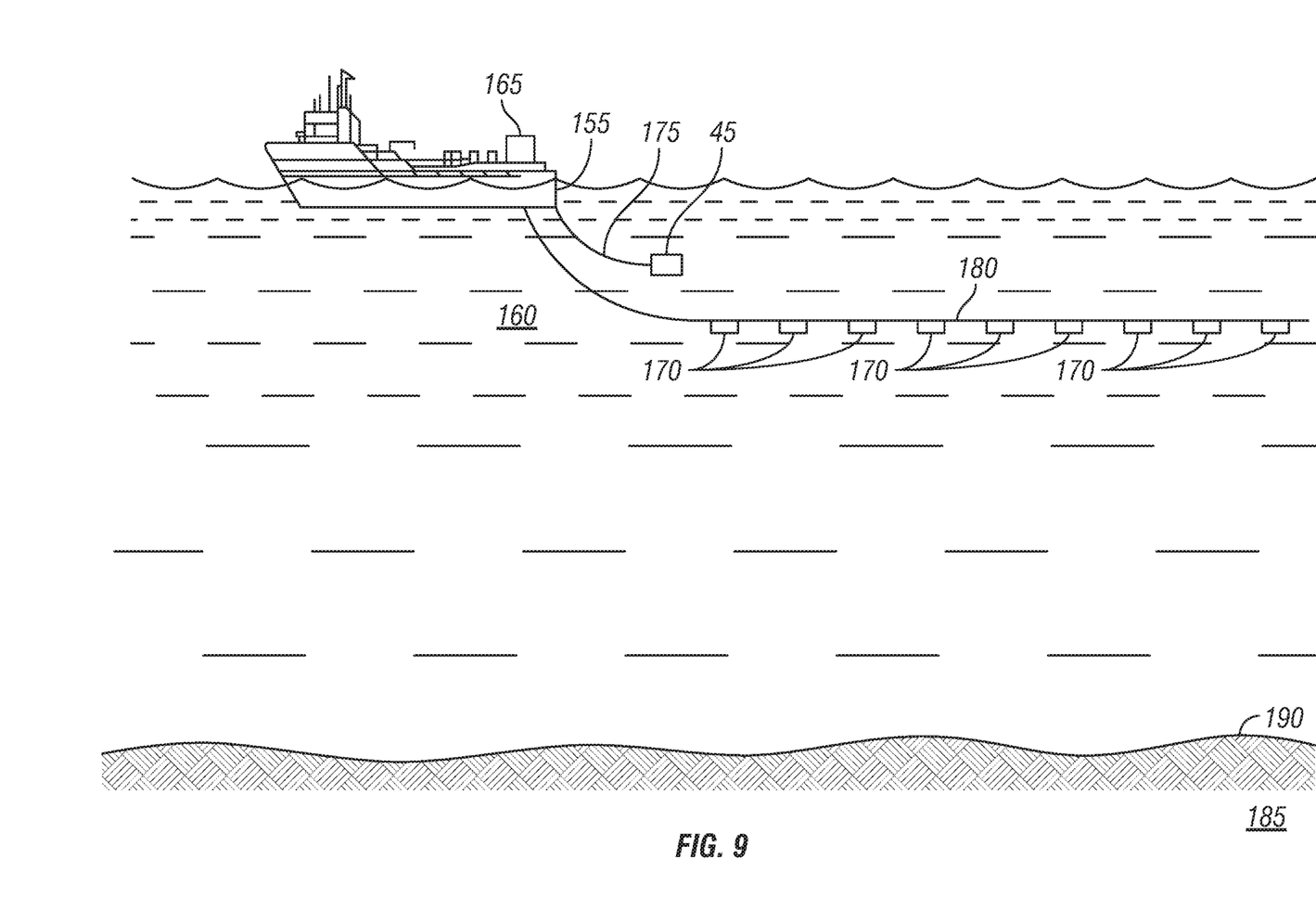
FIG. 9 is an example embodiment of a marine seismic survey system using a marine vibrator.

FIG. 9 illustrates an example technique for acquiring geophysical data that may be used with embodiments of the present techniques. In the illustrated embodiment, a survey vessel 155 moves along the surface of a body of water 160, such as a lake or ocean. The survey vessel 155 may include thereon equipment, shown generally at 165 and collectively referred to herein as a "recording system." The recording system 165 may include devices (none shown separately) for detecting and making a time indexed record of signals generated by each of seismic sensors 170 (explained further below) and for actuating a marine vibrator 45 at selected times. The recording system 165 may also include devices (none shown separately) for determining the geodetic position of the survey vessel 155 and the various seismic sensors 170.

As illustrated, survey vessel 155 (or a different vessel) may tow one or more marine vibrators 45 in body of water 160. In other embodiments, either in addition to or in place of the towed marine vibrators 45, one or more marine vibrators 45 may be disposed at relatively fixed positions in body of water 160, for example, attached to an anchor, fixed platform, anchored buoy, etc. Source cable 175 may couple marine vibrator 45 to survey vessel 155. Marine vibrator 45 may be disposed in body of water 160 at a depth ranging from 0 meters to about 300 meters, for example. While only a single marine vibrator 45 is shown in FIG. 8, it is contemplated that embodiments may include more than one marine vibrator 45 (or other type of sound source) towed by survey vessel 155 or a different vessel. In some embodiments, one or more arrays of marine vibrators 45 may be used. At selected times, marine vibrator 45 may be triggered, for example, by recording system 165, to generate acoustic energy. Survey vessel 155 (or a different vessel) may further tow at least one sensor streamer 180 to detect the acoustic energy that originated from marine vibrator 45 after it has interacted, for example, with rock formations 185 below water bottom 190. As illustrated, both marine vibrator 45 and sensor streamer 180 may be towed above water bottom 190. Sensor streamer 180 may contain seismic sensors 170 thereon at spaced apart locations. In some embodiments, more than one sensor streamer 180 may be towed by survey vessel 155, which may be spaced apart laterally, vertically, or both laterally and vertically. While not shown, some marine seismic surveys locate the seismic sensors 170 on ocean bottom cables or nodes in addition to, or instead of, a sensor streamer 180. Seismic sensors 170 may be any type of seismic sensors known in the art, including hydrophones, geophones, particle velocity sensors, particle displacement sensors, particle acceleration sensors, or pressure gradient sensors, for example. By way of example, seismic sensors 170 may generate response signals, such as electrical or optical signals, in response to detected acoustic energy. Signals generated by seismic sensors 170 may be communicated to recording system 165. The detected energy may be used to infer certain properties of the subsurface rock, such as structure, mineral composition and fluid content, thereby providing information useful in the recovery of hydrocarbons.

The foregoing figures and discussion are not intended to include all features of the present techniques to accommodate a buyer or seller, or to describe the system, nor is such figures and discussion limiting but exemplary and in the spirit of the present techniques.

What is claimed is:

1. A marine vibrator, comprising:
a piston plate moveable back and forth to generate acoustic energy;
an actuator operable to induce movement of the piston plate;
a spring element coupled to the piston plate;
a low pressure chamber comprising a low pressure chamber housing and a low pressure piston slidable in the low pressure chamber, wherein an internal gas pressure of the low pressure chamber is a maximum of 50% of a pressure in the marine vibrator outside the low pressure chamber, wherein the low pressure chamber is disposed in an internal volume of the marine vibrator; and
a linkage assembly comprising a camshaft and one or more belts coupled to the camshaft, wherein the one or more belts interconnect movement the piston plate and the low pressure piston.

2. The marine vibrator of claim 1, wherein the low pressure chamber is disposed in an internal volume of the marine vibrator.

3. The marine vibrator of claim 2, wherein the internal volume of the marine vibrator comprises a gas spring that acts upon the piston plate.

4. The marine vibrator of claim 1, wherein the piston plate forms an exterior surface of the marine vibrator.

5. The marine vibrator of claim 1, wherein the spring element comprises a compression spring.

6. The marine vibrator of claim 1, wherein the one or more belts comprise a low pressure chamber belt coupling the camshaft and the low pressure piston and a moveable structure belt coupling the camshaft and the piston plate.

7. The marine vibrator of claim 1, wherein a mechanical coupling of the piston plate and the low pressure piston by the linkage assembly is non-linear such that movement of the piston plate and the low pressure piston plate is not proportional.

8. The apparatus of claim 1, wherein the piston plate and a housing at least partially define the internal volume of the marine vibrator.

9. A system, comprising:
a marine vibrator comprising:
a housing;
a piston plate moveable back and forth to generate acoustic energy;
a seal disposed between the housing and the piston plate, wherein a marine vibrator internal volume is defined by at least the housing, the piston plate, and the seal;
an actuator operable to induce movement of the piston plate; and
a spring element coupled to the piston plate and disposed in the marine vibrator; and
a pressure compensation system comprising:
a gas spring disposed in the marine vibrator internal volume that acts on the piston plate as the piston plate is displaced inward into the marine vibrator internal volume, wherein a resonance frequency of the marine vibrator is based on a combination of the gas spring and a spring constant of the mechanical spring;
a low pressure chamber disposed in the marine vibrator internal volume, wherein the low pressure chamber comprises a low pressure chamber housing and a low pressure piston slidable in the low pressure chamber, wherein an internal gas pressure of the low pressure chamber is a maximum of 50% of a pressure in the marine vibrator internal volume outside the low pressure chamber; and
a linkage assembly interconnecting the piston plate to the low pressure piston such that movement of the piston plate and the low pressure position are interconnected in a non-linear relationship by a non-linear gear.

10. The system of claim 9, wherein the spring element comprises a compression spring.

11. The system of claim 9, wherein the linkage assembly comprises a camshaft and one or more belts coupled to the camshaft.

12. The system of claim 9, wherein the linkage assembly comprises a camshaft, a low pressure chamber belt coupling the camshaft and the low pressure piston, and a moveable structure belt coupling the camshaft and the piston plate.

13. A method of operating a marine vibrator, comprising:
moving a piston plate of the marine vibrator back and forth to generate acoustic energy, wherein movement of the piston plate is biased by a spring element coupled to the piston plate; and
moving a low pressure piston inward into an internal volume of a low pressure chamber, wherein an internal gas pressure of the low pressure chamber is a maximum of 50% of a pressure in the marine vibrator outside the low pressure chamber, wherein the low pressure chamber is disposed in an internal volume of the marine vibrator, and wherein movement of the low pressure piston is interconnected with movement of the piston plate.

14. The method of claim 13, further towing the marine vibrator in a body of water, wherein the acoustic energy is generated in body of water while the marine vibrator is submerged in the body of water.

15. The method of claim 14, wherein the marine vibrator is towed in a body of water behind a survey vessel.

16. The method of claim 13, wherein the piston plate and the low pressure piston are interconnected by one or more belts coupled to a camshaft.

17. The method of claim 13, wherein the acoustic energy has at least one resonance frequency of about 10 Hertz or lower.

18. The method of claim 13, wherein the step of moving the piston plate and the step of moving the low pressure piston are performed at a first depth, wherein the step of moving the piston plate and moving the low pressure piston are repeated at a second depth, and wherein resonance frequencies of the marine vibrate at the first depth and at the second depth differ by no more than 25%.

19. The method of claim 13, wherein the step of moving the piston plate and the step of moving the low pressure piston are performed at a first depth, wherein the step of moving the piston plate and moving the low pressure piston are repeated at a second depth, and wherein resonance frequencies of the marine vibrate at the first depth and at the second depth differ by no more than 5%.

20. The method of claim 13, wherein the step of moving the piston plate results in a movement of the piston plate that is non-linear with respect to movement of the low pressure piston.

* * * * *